(12) United States Patent
Stunnebrink et al.

(10) Patent No.: US 12,195,999 B2
(45) Date of Patent: Jan. 14, 2025

(54) RING LOCK WITH RELOCKING

(71) Applicant: Schlage Lock Company LLC, Carmel, IN (US)

(72) Inventors: Marco Stunnebrink, Horssen (NL); Manjunatha Ramakrishna, Bangalore (IN); Ramamohan Bhaskar Shettigar, Thane (IN); Arjun S. Kunnath, Kattayam (IN); Ilias Baiazitov, Utrecht (NL); Jan Gerbrand Hutten, Veenendaal (NL); Martin van Ede, Gendt (NL)

(73) Assignee: Schlage Lock Company LLC, Carmel, IN (US)

( * ) Notice: Subject to any disclaimer, the term of this patent is extended or adjusted under 35 U.S.C. 154(b) by 193 days.

(21) Appl. No.: 17/951,546

(22) Filed: Sep. 23, 2022

(65) Prior Publication Data

US 2024/0102316 A1 Mar. 28, 2024

(51) Int. Cl.
*E05B 17/20* (2006.01)
*E05B 17/00* (2006.01)
*E05B 67/24* (2006.01)
*E05B 67/28* (2006.01)
*E05B 67/38* (2006.01)

(52) U.S. Cl.
CPC ...... *E05B 17/2084* (2013.01); *E05B 17/0062* (2013.01); *E05B 67/24* (2013.01); *E05B 67/28* (2013.01); *E05B 67/38* (2013.01)

(58) Field of Classification Search
CPC ............ E05B 17/2084; E05B 17/2088; E05B 17/2092; E05B 17/0054; E05B 17/0062
See application file for complete search history.

(56) References Cited

U.S. PATENT DOCUMENTS

| | | |
|---|---|---|
| 2,855,028 A | 10/1958 | Matthews |
| 2,921,353 A | 1/1960 | Cushman |
| 4,543,806 A | 10/1985 | Papandrea et al. |
| 4,635,782 A | 1/1987 | Wieth et al. |
| 5,197,310 A | 3/1993 | Pedersen |
| 8,854,207 B2 | 10/2014 | Williams |
| 9,512,649 B2 | 12/2016 | Mohamed |
| 9,669,888 B1 | 6/2017 | Singleton |

(Continued)

FOREIGN PATENT DOCUMENTS

| | | |
|---|---|---|
| CN | 108691459 A | 10/2018 |
| DE | 69001894 T2 | 11/1993 |

(Continued)

*Primary Examiner* — Alyson M Merlino
(74) *Attorney, Agent, or Firm* — Taft Stettinius & Hollister LLP (57) ABSTRACT

An exemplary ring lock generally includes a housing, a shackle, a lock cylinder, and a first frangible component. The shackle is movable relative to the housing between an open position and a closed position. The lock cylinder is operable to maintain the shackle in the closed position, and is selectively operable to permit movement of the shackle from the closed position to the open position. The first frangible component is configured to break in response to application of a first threshold torque to the lock cylinder. With the first frangible component broken, the lock cylinder is prevented from permitting movement of the shackle from the closed position to the open position.

15 Claims, 8 Drawing Sheets

(56) References Cited

U.S. PATENT DOCUMENTS 9,976,321 B2    5/2018   Chen
2020/0361552 A1    11/2020   Radenbaugh et al.

FOREIGN PATENT DOCUMENTS

| | | | | |
|---|---|---|---|---|
| DE | 3543201 | C2 | 1/1995 | |
| DE | 10240558 | B4 | 4/2010 | |
| DE | 10240570 | B4 | 4/2010 | |
| DE | 102010008054 | A1 | 8/2011 | |
| DE | 102012102896 | A1 | 10/2013 | |
| DE | 202014006369 | U1 * | 12/2014 | ............ B62H 5/147 |
| DE | 202015104232 | U1 | 9/2015 | |
| DE | 202015104618 | U1 | 10/2015 | |
| DE | 202015105949 | U1 | 12/2015 | |
| DE | 202016101782 | U1 | 6/2016 | |
| DE | 102018006576 | A1 | 2/2020 | |
| DE | 202020106957 | U1 | 1/2021 | |
| EP | 728659 | B1 | 5/1999 | |
| EP | 1418302 | B1 | 8/2005 | |
| EP | 1834864 | A1 | 9/2007 | |
| EP | 1416110 | B1 | 5/2008 | |
| EP | 1717135 | B1 | 2/2009 | |
| EP | 2842847 | B1 | 10/2015 | |
| EP | 2962919 | A1 | 1/2016 | |
| EP | 2962920 | A1 | 1/2016 | |
| EP | 2842846 | B1 | 4/2016 | |
| EP | 3064419 | B1 | 6/2018 | |
| EP | 3566933 | A1 | 11/2019 | |
| NL | 2000149 | C2 | 1/2008 | |
| NL | 2022574 | B1 | 8/2020 | |
| WO | 2014089919 | A1 | 6/2014 | |
| WO | 2021038059 | A1 | 3/2021 | |

\* cited by examiner

RING LOCK WITH RELOCKING

TECHNICAL FIELD

The present disclosure generally relates to portable locks with attack-defeating measures, and more particularly but not exclusively relates to ring locks with mechanisms designed to defeat over-torqueing attacks.

BACKGROUND

Portable lock apparatuses are often used to prevent theft of a portable object, such as a bicycle. One form of portable lock apparatus that is gaining popularity is the ring lock. A ring lock is typically secured to the frame of a bicycle adjacent one of the wheels such that the lock is operable to enclose a portion of the wheel when the ring lock is in its closed condition. In this state, the shackle interferes with the spokes and prevents the wheel from rotating, thereby discouraging a would-be thief from riding the bicycle or other wheeled transport. Many existing ring locks suffer from certain drawbacks and limitations, such as those relating to susceptibility to over-torqueing attacks. For these reasons among others, there remains a need for further improvements in this technological field.

SUMMARY

An exemplary ring lock generally includes a housing, a shackle, a lock cylinder, and a first frangible component. The shackle is movable relative to the housing between an open position and a closed position. The lock cylinder is operable to maintain the shackle in the closed position, and is selectively operable to permit movement of the shackle from the closed position to the open position. The first frangible component is configured to break in response to application of a first threshold torque to the lock cylinder. With the first frangible component broken, the lock cylinder is prevented from permitting movement of the shackle from the closed position to the open position. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
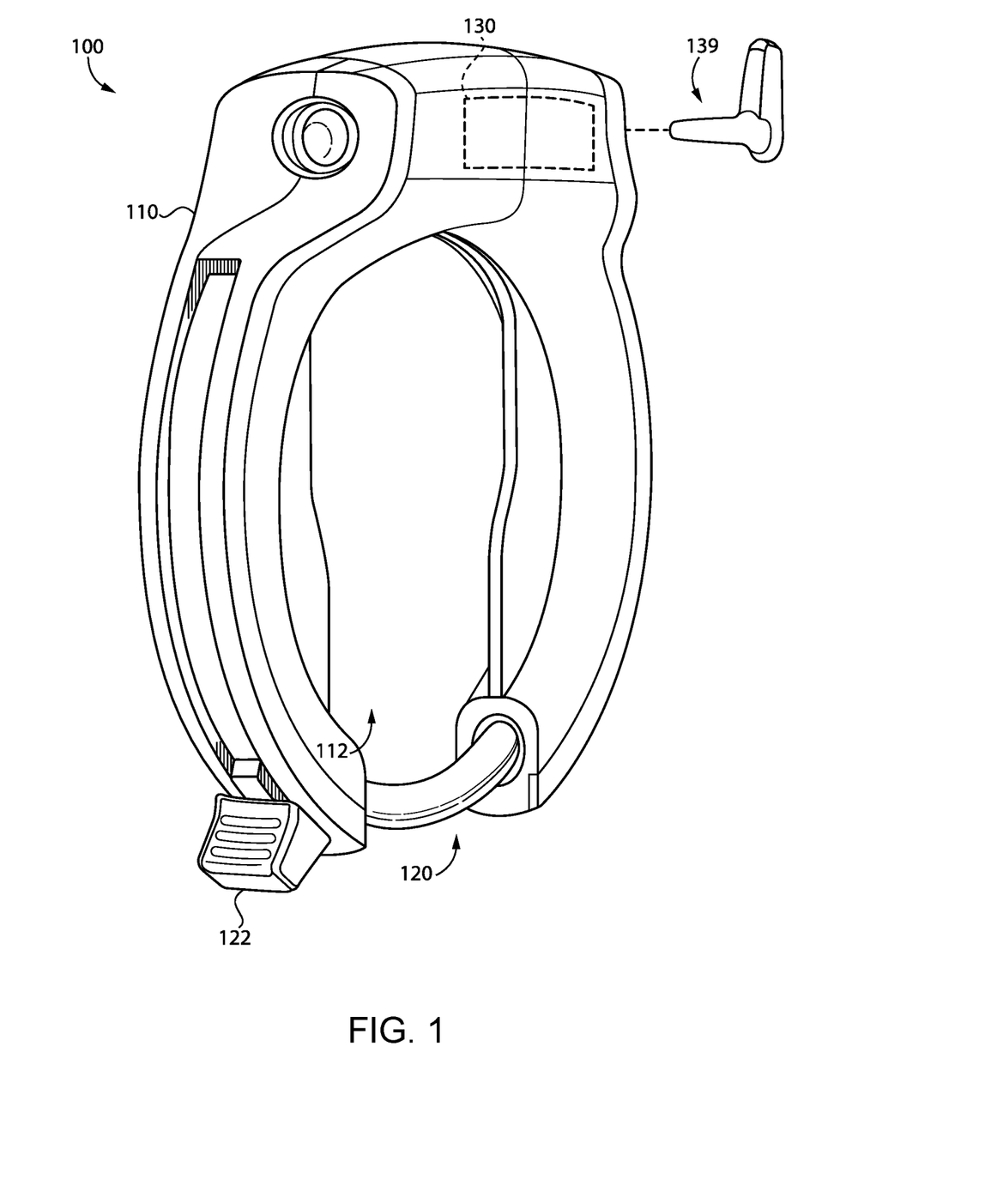
FIG. 1 is a perspective illustration of a ring lock according to certain embodiments.

With reference to FIG. 1, illustrated therein is a portable lock apparatus according to certain embodiments, which in the illustrated form is provided in the form of a ring lock 100. The ring lock 100 generally includes a housing 110, a shackle 120 mounted for movement relative to the housing 110 between a closed position and an open position, and a lock cylinder 130 operable to selectively retain the shackle 120 in the closed position.

The housing 110 encloses one or more other components of the ring lock 100, and provides a base to which one or more components of the ring lock 100 may be mounted. In the illustrated form, the housing 110 is configured for mounting to a wheeled transportation device (e.g., a bicycle or motorcycle) adjacent a wheel of the transportation device, and includes an opening 112 operable to receive a portion of the wheel of the transportation device.

The shackle 120 is mounted for movement relative to the housing 110 between an open position and a closed position, and is operable to be retained in the closed position by the lock cylinder 130. In certain embodiments, the lock cylinder 130 may also be operable to selectively retain the shackle 120 in its open position, as described herein. With the shackle 120 in the closed position, a portion of the wheel of the transportation device is captured within the enclosed opening 112, and the shackle 120 interferes with spokes of the wheel to prevent rotation of the wheel relative to the frame. When the shackle 120 is in its open position, the shackle 120 is received in the housing 110, and the wheel is free to rotate. A driver 122 is connected with the shackle 120, and facilitates manual manipulation of the shackle 120 between its open position and its closed position.

The lock cylinder 130 is operable by an appropriate key 139, and can be transitioned between a locked state and an unlocked state by the key 139. During standard operation of the ring lock 100, the lock cylinder 130 is operable to selectively retain the shackle 120 in its closed position. More particularly, the lock cylinder 130 is operable to retain the shackle 120 in its closed position when the lock cylinder 130 is in its locked state, and permits movement of the shackle 120 between its open position and its closed position when the lock cylinder 130 is in its unlocked state. As described herein, one or more attack-defeating measures of the ring lock 100 are configured to prevent the lock cylinder 130 from releasing the shackle 120 when the ring lock 100 is subjected to an over-torqueing attack.

Figure 2:
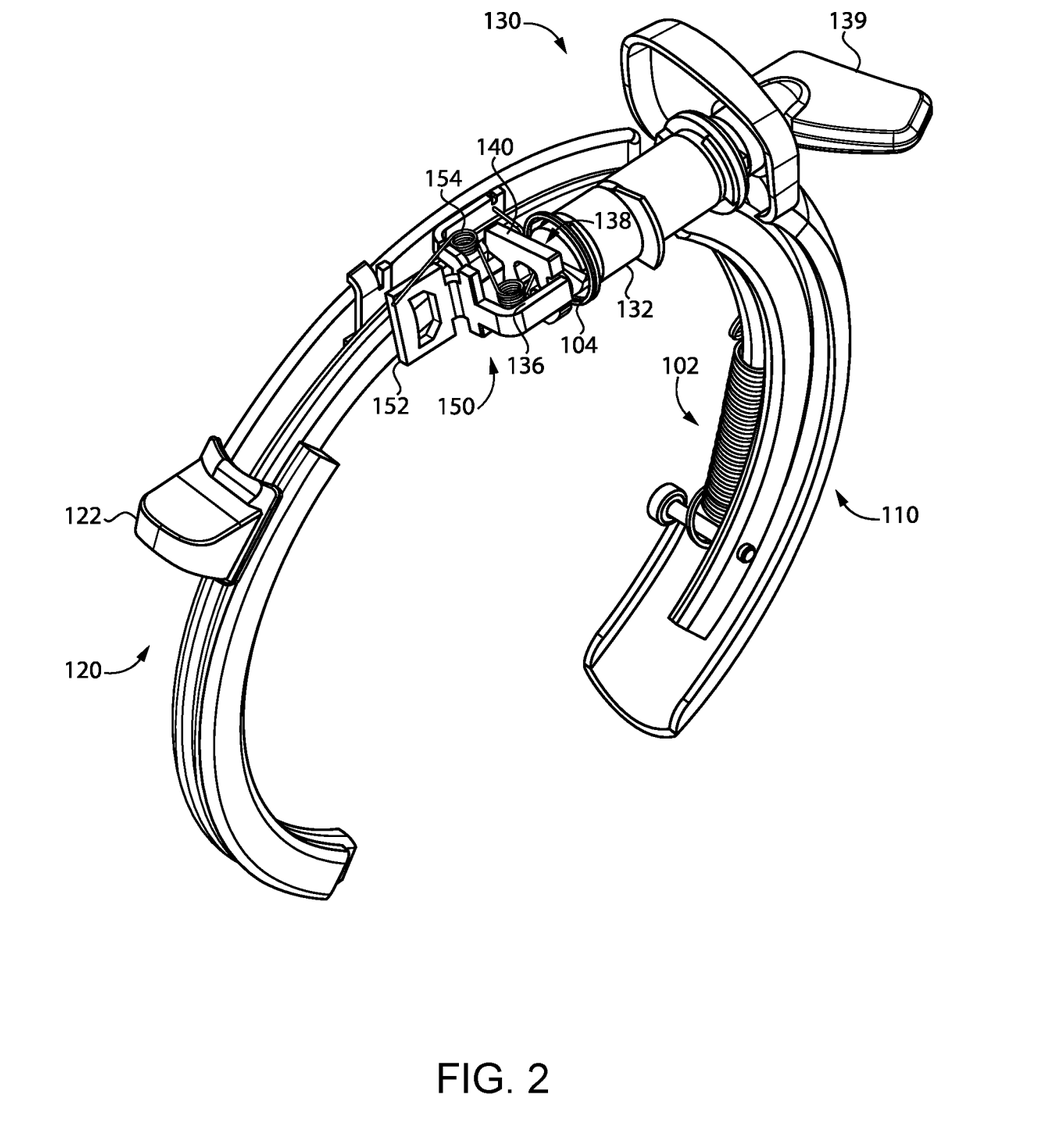
FIG. 2 is a perspective illustration of a portion of the ring lock.

With additional reference to FIG. 2, illustrated therein is the ring lock 100 with one or more selected components of the housing 110 removed to more clearly illustrate the remaining components of the ring lock 100. The illustrated ring lock 100 includes a bias member such as a spring 102, which is engaged between the housing 110 and the shackle 120 to thereby bias the shackle 120 toward its open position. While the illustrated bias member is provided in the form of an extension spring 102, it should be appreciated that the bias member may take another form, such as one including a compression spring, a leaf spring, a torsion spring, an elastic member, and/or one or more magnets. As described herein, the illustrated ring lock 100 further includes a latch 140 operable to selectively retain the shackle 120 in its closed position, and a bias mechanism 150 biasing the latch 140 toward a blocking position.

The lock cylinder 130 generally includes a plug 132 rotatably mounted in the housing 110, a tumbler assembly including a plurality of tumblers 134 movably mounted in the plug 132, and a cam 136 mounted to the plug 132. The tumblers 134 are operable to selectively prevent rotation of the plug 132 relative to the housing 110. In certain embodiments, the lock cylinder 130 further includes a frangible component 138 selectively coupling the cam 136 to the plug 132. As described herein, the illustrated cam 136 is eccentrically mounted to the plug 132 via the frangible component 138, and is received within an opening 142 of the latch 140 such that the lock cylinder 130 is selectively operable to drive the latch 140 between a blocking position and an unblocking position.

Figure 3:
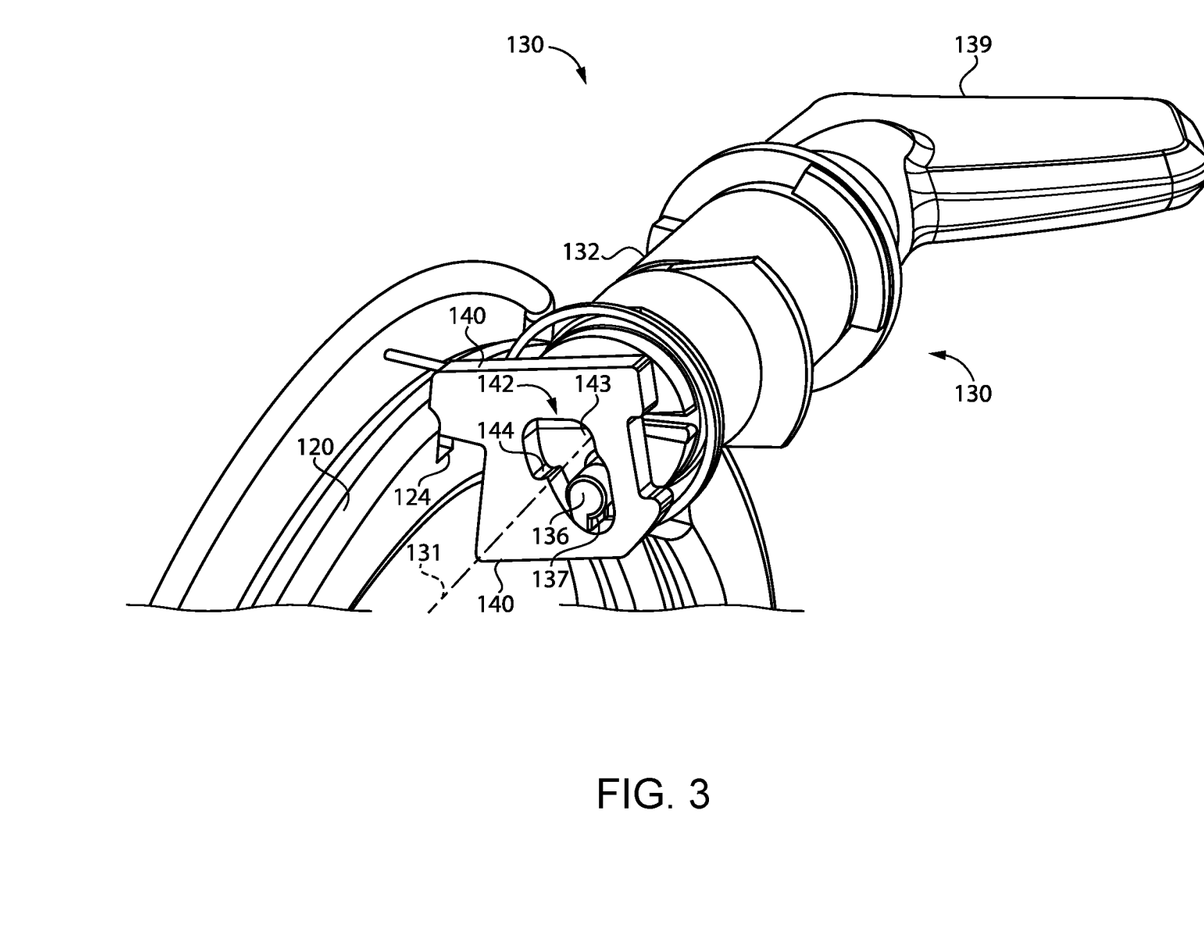
FIG. 3 is a perspective illustration of a portion of the ring lock.
Figure 4:
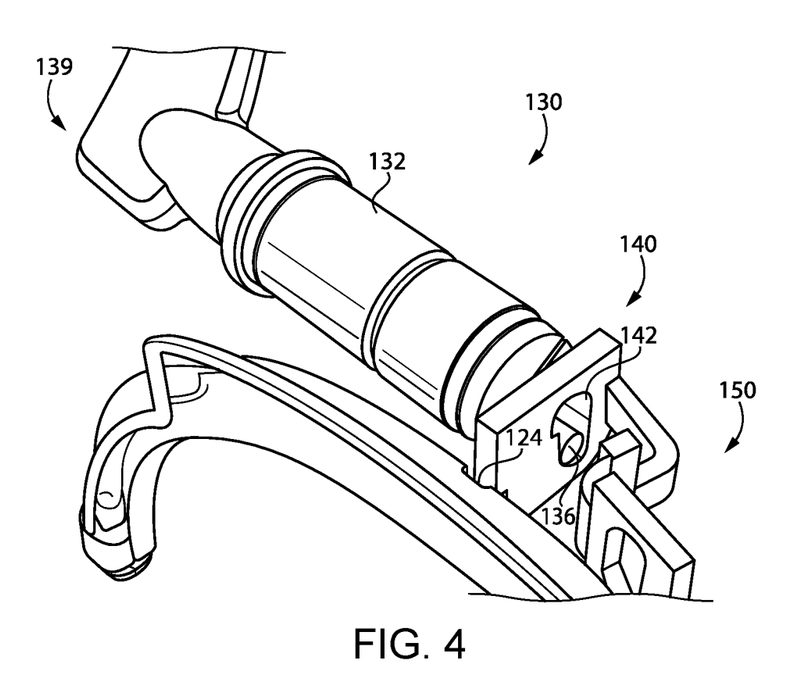
FIG. 4 illustrates a portion of the ring lock with a latch in an unblocking position.

With additional reference to FIG. 3, the latch 140 is slidably mounted in the housing 110 for lateral movement between a blocking position (FIG. 3) and an unblocking position (FIG. 4). The lateral direction is transverse to a rotational axis 131 of the plug 132. In the state illustrated in FIG. 3, the shackle 120 is in its open position, and a portion of the latch 140 is engaged with an open position notch 124 formed in the shackle 120 such that the latch 140 in its blocking position retains the shackle 120 in its open position. The latch 140 includes an opening 142 that receives the cam 136. In the illustrated form, the opening 142 has an outer periphery 143 that includes a ledge 144.

The bias mechanism 150 biases the latch 140 toward its blocking position, and in the illustrated form includes a pivot plate 152 and a bias member 154 in the form of a double torsion spring. The pivot plate 152 is pivotably mounted within the housing 110, and the bias member 154 is engaged between the housing 110 and the pivot plate 152 to thereby cause the pivot plate 152 to bias the latch 140 toward its blocking position. While the illustrated bias member 154 is provided in the form of a double torsion spring, it is also contemplated that the bias member 154 may be provided in another form, such as one including a standard torsion spring, a compression spring, an extension spring, a leaf spring, an elastic member, and/or magnets.

With additional reference to FIG. 4, illustrated therein is a portion of the ring lock 100 with the shackle 120 in its open position and the lock cylinder 130 in its unlocked state. In this state, the appropriate key 139 has been inserted and rotated to thereby drive the latch 140 to its unblocking position, in which the latch 140 is disengaged from the open position notch 124. As such, the shackle 120 is free to move from its open position toward its closed position.

Figure 5:
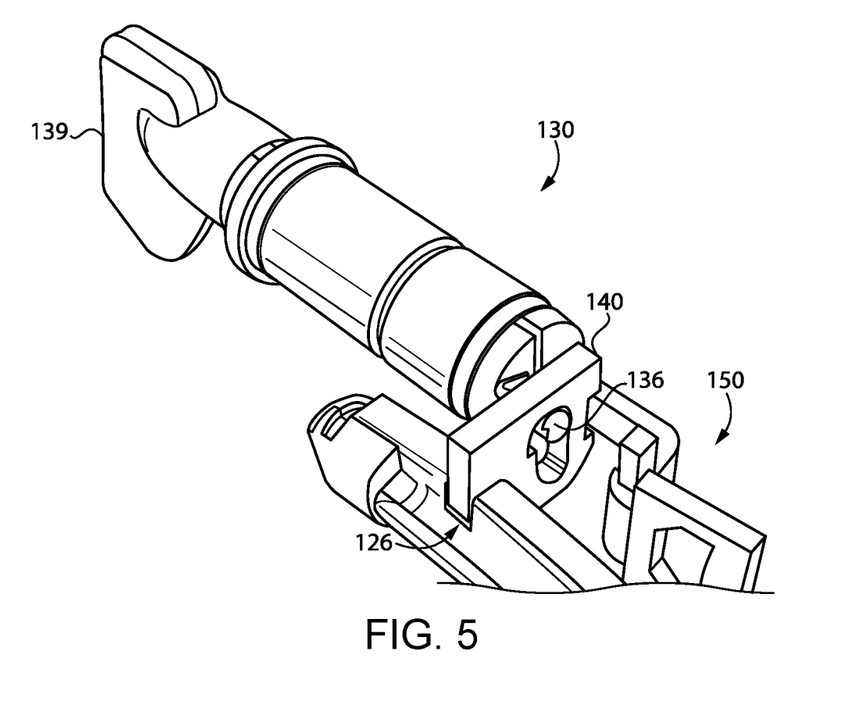
FIG. 5 illustrates a portion of the ring lock with the latch in a blocking position.

With additional reference to FIG. 5, illustrated therein is a portion of the ring lock 100 with the shackle 120 in its closed position and the lock cylinder 130 in its locked state. In this state, the latch 140 is in its blocking position, in which the latch 140 is engaged with a closed position notch 126 of the shackle 120 to thereby retain the shackle 120 in its closed position.

During standard operation of the ring lock 100, insertion of the key 139 enables rotation of the plug 132 relative to the housing 110, and such rotation of the plug 132 causes the cam 136 to drive the latch 140 between its blocking position and its unblocking position. As described herein, however, such actuation of the latch 140 by the lock cylinder 130 may be selectively prevented in response to an over-torqueing attack on the lock cylinder 130.

Figure 6:
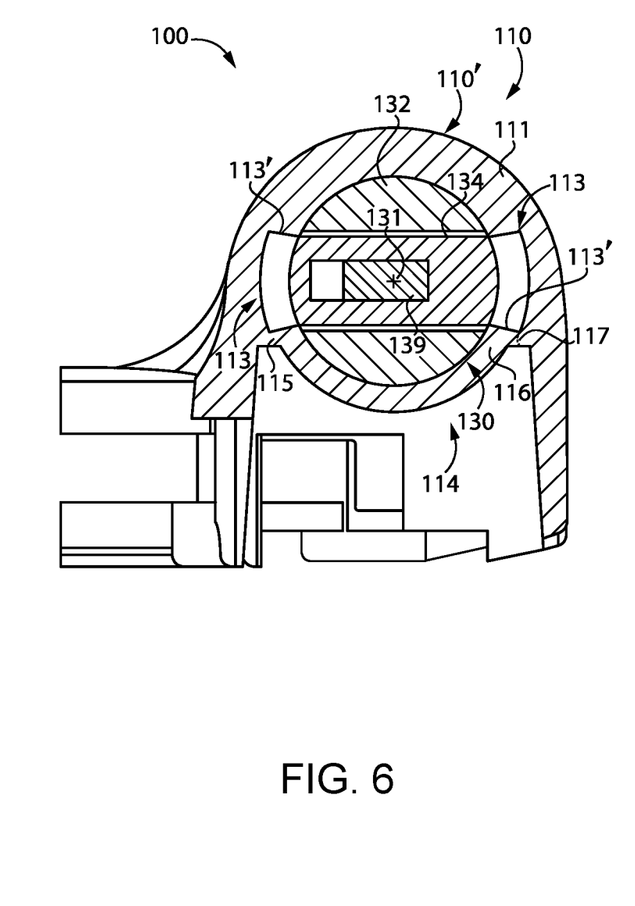
FIG. 6 is an end view of a portion of the ring lock with a frangible component in an unbroken state.

With additional reference to FIG. 6, illustrated therein is a cross-sectional view of a portion of the ring lock 100 during standard operation. In this state, wings 135 of the tumblers 134 are received in recesses 113 of a housing component 110' of the housing 110, which includes a wall 114 that supports the plug 132. A first end 115 of the wall 114 is coupled to a body 111 of the housing 110, and the opposite second end 116 of the wall 114 is coupled to the housing body 111 via a frangible area 117. During standard operation of the ring lock 100, insertion of the key 139 enables rotation of the plug 132 relative to the housing 110 as described above.

One common method of attacking a portable lock apparatus such as a ring lock involves inserting a tampering tool (e.g., a "power key") into the lock cylinder, and exerting an excessive torque on the lock cylinder via the tampering tool. In conventional lock cylinders, such an over-torqueing attack may cause the tumbler assembly or sidebar to shear, thereby permitting rotation of the plug and unlocking of the ring lock. As described herein, however, such an over-torqueing attack may be defeated by one or more features of the ring lock 100, rendering the ring lock 100 less susceptible to such over-torqueing attacks.

Figure 7:
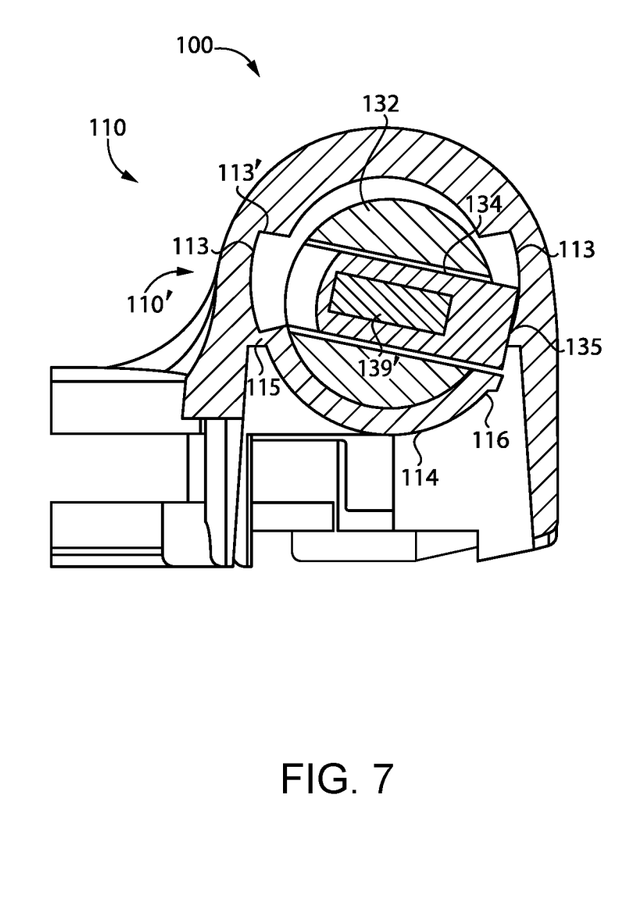
FIG. 7 is an end view of a portion of the ring lock with the frangible component in a broken state.

With additional reference to FIG. 7, illustrated therein is a cross-sectional view similar to that presented in FIG. 6. In the state illustrated in FIG. 7, however, a tampering tool 139' has been inserted into the plug 132 in place of the appropriate key 139. Without the appropriate key 139, the tumbler system of the lock cylinder 130 prevents rotation of the plug 132 relative to the housing 110. As a result, the torque exerted by the tampering tool 139' on the plug 132 in the unlocking direction (clockwise in FIGS. 6 and 7) is transmitted to the housing 110 via the tumblers 134. More particularly, the torque is transmitted from the tumblers 134 to the housing 110 via engagement of the wings 135 with the engagement surfaces 113' of the recesses 113. One such engagement surface 113' (the upper left engagement surface in FIG. 7) provides an anchor point for rotation of the lock cylinder 130, and the other engagement surface 113' (the lower right engagement surface in FIG. 7) is positioned in close proximity to the frangible area 117.

As a result of the relative positions of the engagement surfaces 113', the torque exerted via the tampering tool 139' is converted to a shear force at the frangible area 117. Once the torque reaches a threshold torque value corresponding to a shear strength of the frangible area 117, the housing 110 breaks at the frangible area 117. As a result, the wall 114 pivots about the first end 115, and the lock cylinder 130 moves to a displaced position. In certain embodiments, a bias member 104 (FIG. 2) may retain the lock cylinder 130 in the displaced position. In the illustrated form, the lock cylinder 130 moves from its home position to its displaced position in a direction transverse to the rotational axis 131 of the plug 132. It is also contemplated that the lock cylinder 130 may additionally or alternatively move from its home position to its displaced position in a direction along the rotational axis 131 of the plug 132.

Figure 8:
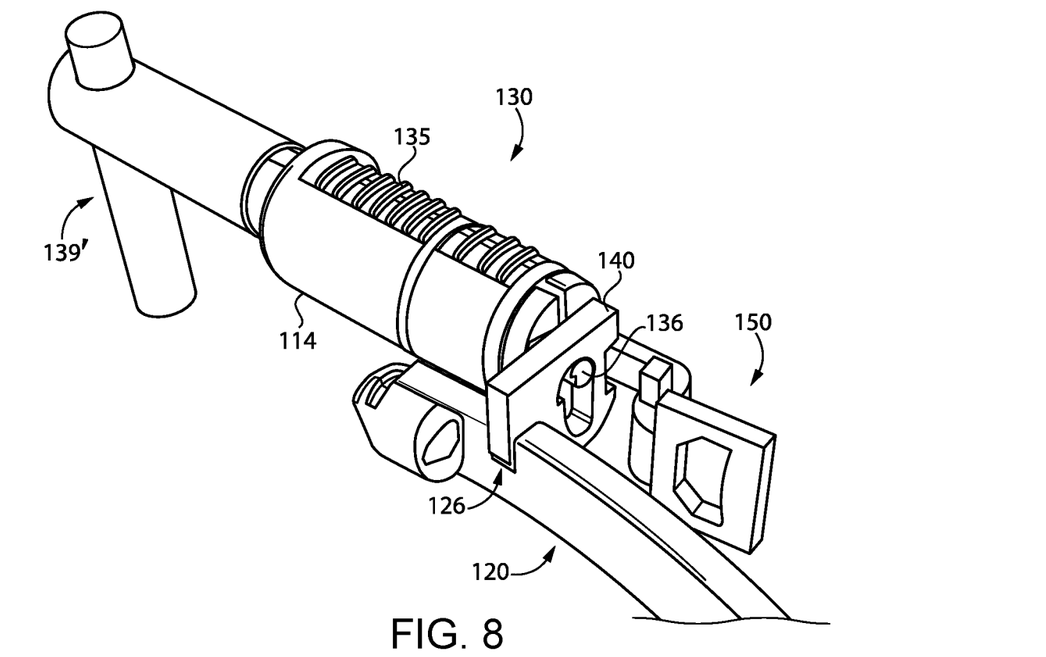
FIGS. 8-11 illustrate a portion of the ring lock during various stages of an attack on the ring lock

With additional reference to FIGS. 8-11, illustrated therein is the ring lock 100 during various stages of the over-torqueing attack described above. In FIG. 8, the tampering tool 139' has been inserted, but has not yet been rotated. As a result, both ends 115, 116 of the wall 114 remain coupled to the body 111, and the wall 114 remains in its home position. Rotation of the tampering tool 139' moves the ring lock 100 to the state illustrated in FIG. 9, in which the housing 110 has sheared at the frangible area 117, and the wall 114 and lock cylinder 130 have been moved to the displaced positions thereof. In this state, a shoulder 137 of the cam 136 is aligned with the ledge 144.

Figure 9:
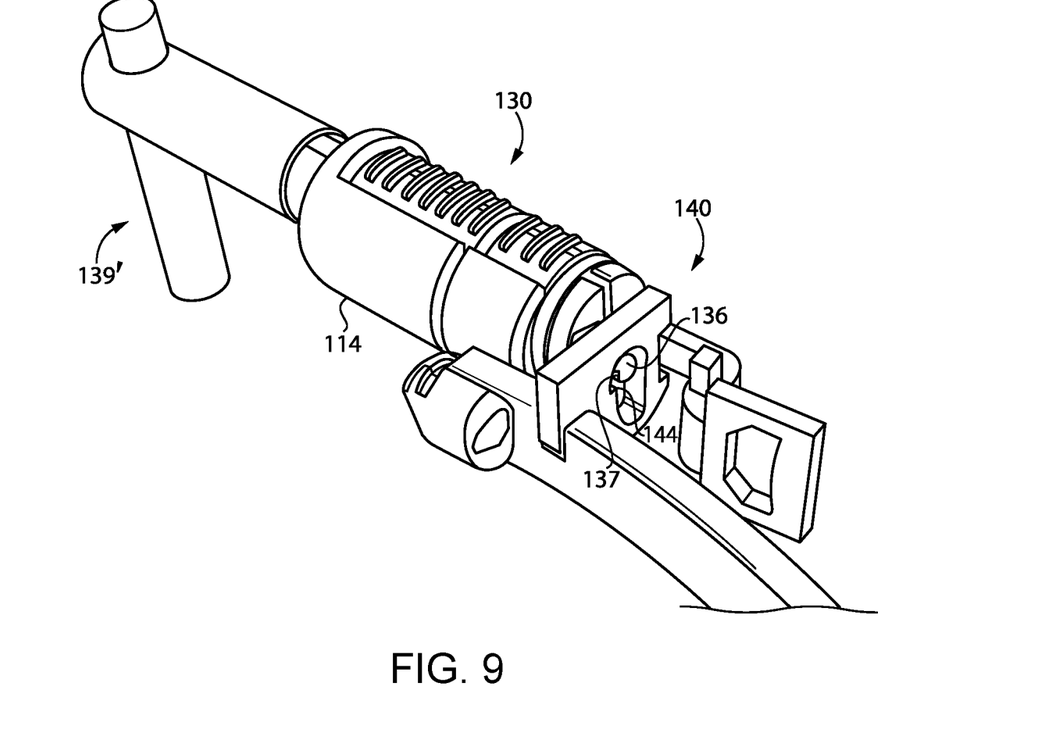
Figure 10:
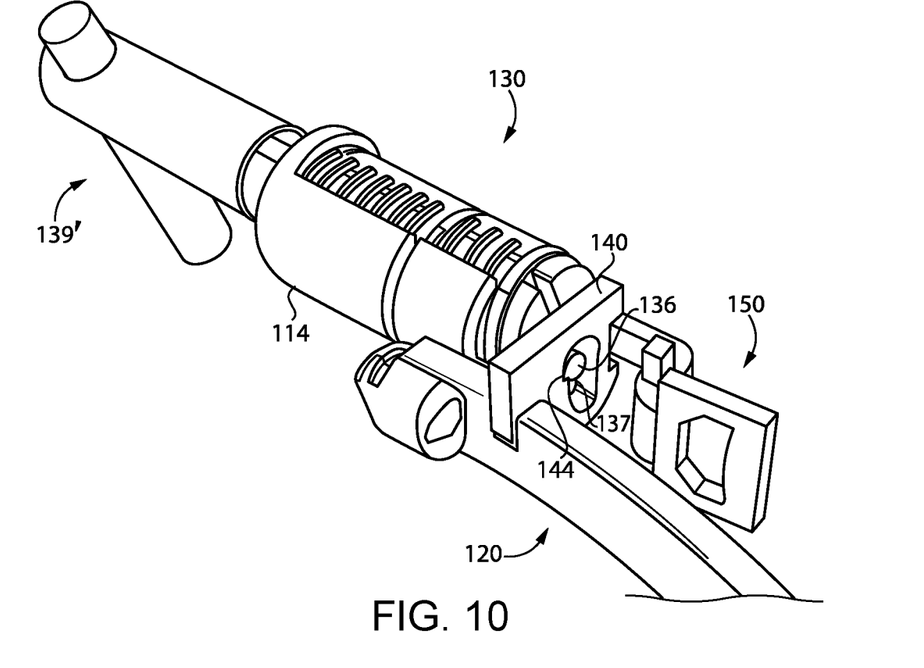
Figure 11:
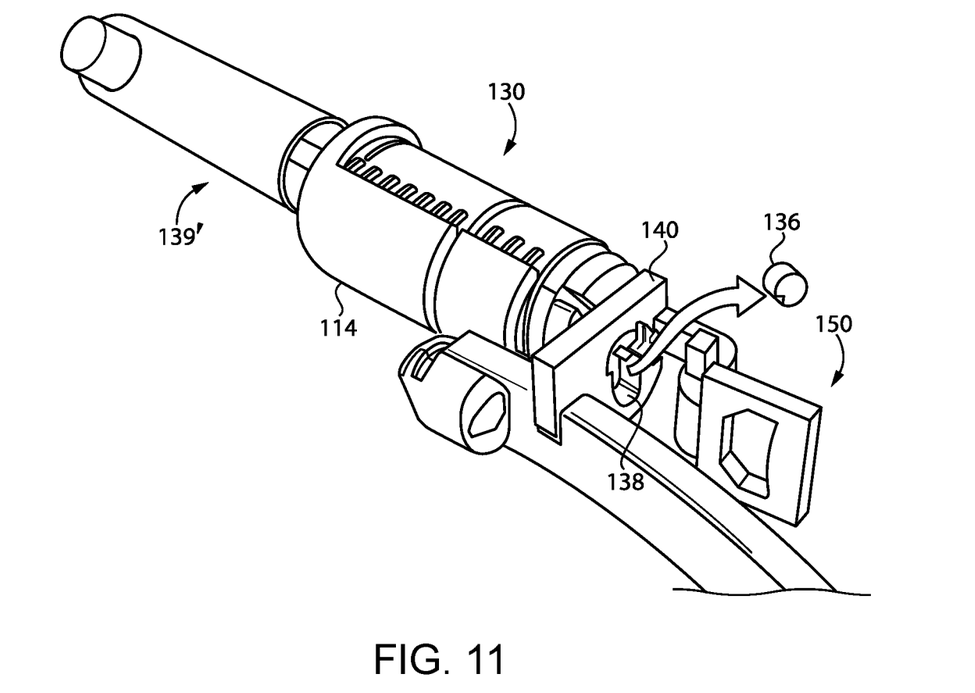

With the ring lock 100 in the state illustrated in FIG. 9, further rotation of the tampering tool 139' drives the ring lock 100 to the state illustrated in FIG. 10. In this state, the shoulder 137 is engaged with the ledge 144, and retraction of the latch 140 by the cam 136 is prevented. In certain embodiments, further rotation of the tampering tool 139' may cause the frangible component 138 to shear, resulting in decoupling of the cam 136 from the plug 134. With the cam 136 removed from the plug 134, retraction of the latch 140 by the lock cylinder 130 is prevented. As a result, the ring lock 100 remains locked with the shackle 120 in its closed position, and the attack is defeated.

As should be evident from the foregoing, the use of one or more frangible components may aid in defeating an over-torqueing attack. As one example, a frangible housing component 110' that includes a frangible area 117 may aid in defeating over-torqueing attacks by causing the lock cylinder 130 to move to a displaced position in which the lock cylinder 130 is inoperable to retract the latch 140. In certain embodiments, a frangible lock cylinder component (e.g., the frangible component 138) may cause the cam 136 to shear from the plug 132 during the over-torqueing attack, thereby defeating such an attack.

In the illustrated form, the wall 114 is coupled to the remainder of the housing 110 at the first end 115 thereof, and the second end 116 of the wall 114 is also initially coupled to the housing 110 via the frangible area 117. It is also contemplated that the wall 114 may be coupled to the housing 110 only via the first end 115 such that the wall 114 is cantilevered. In such forms, the first end 115 may be provided with an increased thickness and/or act as a living hinge about which the remainder of the wall 114 is operable to pivot.

Figure 12:
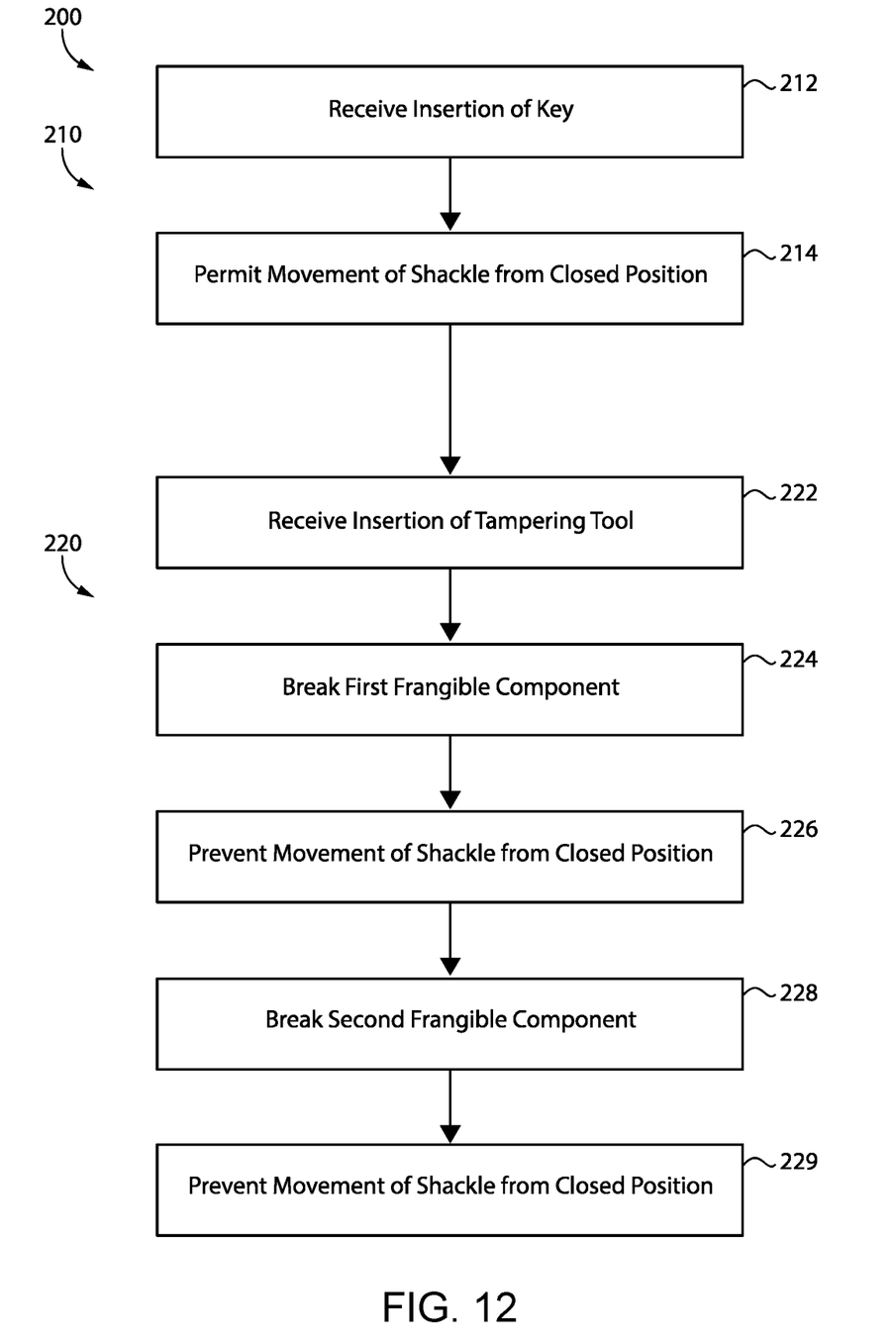
FIG. 12 is a schematic flow diagram of a process according to certain embodiments.

With additional reference to FIG. 12, an exemplary process 200 that may be performed using the ring lock 100 is illustrated. Blocks illustrated for the processes in the present application are understood to be examples only, and blocks may be combined or divided, and added or removed, as well as re-ordered in whole or in part, unless explicitly stated to the contrary. Although the blocks are illustrated in a relatively serial fashion, it is to be understood that two or more of the blocks may be performed concurrently or in parallel with one another. Moreover, while the process 200 is described herein with specific reference to the ring lock 100 illustrated in FIGS. 1-11, it is to be appreciated that the process 200 may be performed with portable lock apparatuses having additional and/or alternative features.

In certain embodiments, the process 200 may be performed using a portable lock apparatus including a lock cylinder, a shackle, and a first frangible component. As one example, the process 200 may be performed using the ring lock 100, which generally includes a lock cylinder 130, a shackle 120, and a first frangible component. In certain embodiments, the first frangible component may be a frangible component of the housing 110, for example as described above with reference to FIGS. 6 and 7. Additionally or alternatively, the first frangible component may be a frangible component of the lock cylinder 130, such as the frangible component 138. In certain embodiments, the portable lock apparatus may include a second frangible component (e.g., the other of the frangible housing component or the frangible lock cylinder component).

The process 200 may include flow 210, which generally involves standard operation of the portable lock apparatus. Flow 210 may include block 212, which generally involves receiving insertion of a key into the lock cylinder of the portable lock apparatus. For example, block 212 may involve receiving insertion of the key 139 into the lock cylinder 130.

Flow 210 may further include block 214, which may be performed in response to rotation of the key to an unlocking orientation, and which generally involves permitting movement of the shackle between an open position and a closed position. For example, block 214 may be performed in response to rotation of the key 139 from a locking orientation (FIG. 2) to an unlocking orientation (FIG. 4), thereby permitting movement of the shackle 120 between its open position (FIG. 4) and its closed position (FIG. 5).

The process 200 may include flow 220, which generally involves defeating an over-torqueing attack. Flow 220 may include block 222, which may be performed with the shackle in a closed position, and which generally involves receiving insertion of a tampering tool into the lock cylinder. For example, block 222 may involve receiving insertion of the tampering tool 139' to the lock cylinder 130.

Flow 220 may include block 224, which may be performed in response to application of a first threshold torque to the lock cylinder via the tampering tool, and which generally involves breaking the first frangible component. For example, block 224 may be performed in response to application of the first threshold torque to the lock cylinder 130 via the tampering tool 139', and may involve breaking the frangible housing component 110' as described above.

In certain embodiments, the first threshold torque is greater than the torque at which a normal key will break. For example, if it is found that a normal authorized key will break at torques between 4 and 6 Newton-meters (N·m), the first threshold torque may be at least 6 N·m. In certain embodiments, the first threshold torque is at least 7 Newton-meters (N·m), at least 8 N·m, at least 9 N·m, or at least 10 N·m.

In certain embodiments, the first threshold torque is less than the torque at which the lock cylinder 130 will typically break. For example, if it is found that the lock cylinder 130 breaks in response to torques between 15 N·m and 25 N·m, the first threshold torque may be 15 N·m or less. In certain embodiments, the first threshold torque is no greater than 10 N·m, no greater than 13 N·m, or no greater than 15 N·m.

In certain embodiments, the first threshold torque is both greater than the torque at which the key will break and less than the torque at which the lock cylinder 130 will break. In certain embodiments, the first threshold torque is between 7 N·m and 13 N·m.

Flow 220 may include block 226, which generally involves preventing movement of the shackle from the closed position as a result of breaking the first frangible component. For example, block 226 may involve preventing movement of the shackle 120 from the closed position as a result of breaking the frangible housing component 110'.

In certain embodiments, flow 220 may include block 228. Block 228 may be performed after breaking the first frangible component, and may involve breaking the second frangible component in response to application of a second threshold torque to the lock cylinder via the tampering tool. For example, block 228 may involve causing the frangible lock cylinder component 138 to break when the shoulder 137 is engaged with the ledge 144 and the second threshold torque is applied. In certain embodiments, the second threshold torque may be greater than the first threshold torque. In certain embodiments, the second threshold torque is at least 8 Newton-meters (N·m), at least 9 N·m, or at least 10 N·m. In certain embodiments, the second threshold torque is no greater than 25 N·m, no greater than 20 N·m, or no greater than 15 N·m.

In certain embodiments, flow 220 may include block 229, which generally involves preventing movement of the shackle from the closed position as a result of breaking the second frangible component. For example, block 229 may involve preventing movement of the shackle 120 from its closed position as a result of breaking the frangible lock cylinder component 138.

Certain embodiments of the present application relate to a portable lock apparatus, comprising: a housing; a shackle movable relative to the housing movement between an open position and a closed position; a latch movably mounted to the housing for movement between a blocking position and an unblocking position, wherein the latch in the blocking position is operable to retain the shackle in the closed position, and wherein the latch in the unblocking position is inoperable to retain the shackle in the closed position; a lock cylinder selectively operable to move the latch between the blocking position and the unblocking position; and a frangible component configured to break in response to application of a threshold torque on the lock cylinder; wherein the lock cylinder is operable to move the latch between the blocking position and the unblocking position when the frangible component is unbroken; and wherein the lock cylinder is inoperable to move the latch from the blocking position to the unblocking position when the frangible component is broken.

In certain embodiments, the housing comprises the frangible component.

In certain embodiments, the housing comprises a body and a wall coupled to the body via the frangible component; and wherein breaking of the frangible component causes at least a portion of the wall to separate from the body, thereby enabling movement of the lock cylinder to a displaced position.

In certain embodiments, the threshold torque is 20 Newton-meters or less.

In certain embodiments, the threshold torque is 10 Newton-meters or greater.

In certain embodiments, the lock cylinder comprises a cam including a shoulder; wherein the latch comprises a ledge; wherein the lock cylinder is configured to move to a displaced position in response to breaking of the frangible component; and wherein, with the lock cylinder in the displaced position, the shoulder is operable to engage the ledge to prevent further movement of the cam.

In certain embodiments, the lock cylinder further comprises a plug and an additional frangible component coupling the cam with the plug; and wherein the additional frangible component is configured to break in response to application of a second threshold torque to the lock cylinder.

Certain embodiments of the present application relate to a ring lock, comprising: a housing; a shackle movable relative to the housing between an open position and a closed position; a lock cylinder operable to maintain the shackle in the closed position, and selectively operable to permit movement of the shackle from the closed position to the open position; and a first frangible component, wherein the first frangible component is configured to break in response to application of a first threshold torque to the lock cylinder; and wherein, with the first frangible component broken, the lock cylinder is prevented from permitting movement of the shackle from the closed position to the open position.

In certain embodiments, the housing comprises the first frangible component.

In certain embodiments, the lock cylinder comprises a second frangible component configured to break in response to application of a second threshold torque to the lock cylinder; and wherein, with the second frangible component broken, the lock cylinder is prevented from permitting movement of the shackle from the closed position to the open position.

In certain embodiments, the lock cylinder is configured to move to a displaced position in response to breaking of the first frangible component.

In certain embodiments, the ring lock further comprises a second frangible component; and wherein, with the lock cylinder in the displaced position, the second frangible component is configured to break in response to application of a second threshold torque to the lock cylinder.

In certain embodiments, the ring lock further comprises a latch, the latch having a blocking position in which the latch is operable to retain the shackle in the closed position, the latch having an unblocking position in which the latch is inoperable to retain the shackle in the closed position; wherein, with the first frangible component unbroken, the lock cylinder is operable to move the latch from the blocking position to the unblocking position; and wherein, with the first frangible component broken, the lock cylinder is inoperable to move the latch from the blocking position to the unblocking position.

In certain embodiments, the lock cylinder comprises: a shell; a plug rotatably mounted in the shell; and a cam coupled with the plug, the cam including a shoulder; wherein the shoulder is operable to move past a ledge of the latch when the first frangible component is unbroken; and wherein the shoulder is configured to engage the ledge when the first frangible component is broken.

In certain embodiments, the cam is coupled with the plug via a second frangible component configured to break in response to application of a second threshold torque to the lock cylinder when the shoulder is engaged with the ledge.

Certain embodiments of the present application relate to a method of operating a portable lock apparatus comprising a lock cylinder, a shackle, and a first frangible component, the method comprising: receiving insertion of a key in the lock cylinder; in response to rotation of the key to an unlocking orientation, permitting movement of the shackle between an open position and a closed position; with the shackle in the closed position, receiving insertion of a tampering tool to the lock cylinder; in response to application of a first threshold torque to the lock cylinder via the tampering tool, breaking the first frangible component; and preventing movement of the shackle from the closed position as a result of breaking the first frangible component.

In certain embodiments, the portable lock apparatus further comprises a second frangible component; and wherein the method further comprises: after breaking the first frangible component, breaking the second frangible component in response to application of a second threshold torque to the lock cylinder via the tampering tool; and preventing movement of the shackle from the closed position as a result of breaking the second frangible component.

In certain embodiments, the portable lock apparatus further comprises a housing; wherein the housing comprises the first frangible component; wherein the housing retains the lock cylinder in a home position when the first frangible component is unbroken; and wherein the lock cylinder moves from the home position to a displaced position in response to breaking of the first frangible component.

In certain embodiments, preventing movement of the shackle from the closed position as a result of breaking the first frangible component comprises shifting the lock cylinder from a home position to a displaced position in response to breaking of the first frangible component.

In certain embodiments, preventing movement of the shackle from the closed position as a result of breaking the first frangible component comprises decoupling a cam of the lock cylinder from a plug of the lock cylinder in response to breaking of the first frangible component.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A portable lock apparatus, comprising:
a housing;
a shackle movable relative to the housing between an open position and a closed position;
a latch movably mounted to the housing for movement between a blocking position and an unblocking position, wherein the latch in the blocking position is operable to retain the shackle in the closed position, and wherein the latch in the unblocking position is inoperable to retain the shackle in the closed position;
a lock cylinder selectively operable to move the latch between the blocking position and the unblocking position; and
a frangible component configured to break in response to application of a threshold torque on the lock cylinder;
wherein the lock cylinder is operable to move the latch between the blocking position and the unblocking position when the frangible component is unbroken;
wherein the lock cylinder is inoperable to move the latch from the blocking position to the unblocking position when the frangible component is broken;
wherein the housing comprises the frangible component, a body, and a wall coupled to the body via the frangible component; and
wherein breaking of the frangible component causes at least a portion of the wall to separate from the body, thereby enabling movement of the lock cylinder to a displaced position.

2. The portable lock apparatus of claim 1, wherein the threshold torque is 20 Newton-meters or less.

3. The portable lock apparatus of claim 2, wherein the threshold torque is 10 Newton-meters or greater.

4. The portable lock apparatus of claim 1, wherein the lock cylinder comprises a cam including a shoulder;
wherein the latch comprises a ledge;
wherein the lock cylinder is configured to move to a displaced position in response to breaking of the frangible component; and
wherein, with the lock cylinder in the displaced position, the shoulder is operable to engage the ledge to prevent further movement of the cam.

5. The portable lock apparatus of claim 4, wherein the lock cylinder further comprises a plug and an additional frangible component coupling the cam with the plug; and
wherein the additional frangible component is configured to break in response to application of a second threshold torque to the lock cylinder.

6. A ring lock, comprising:
a housing;
a shackle movable relative to the housing between an open position and a closed position;
a lock cylinder operable to maintain the shackle in the closed position, and selectively operable to permit movement of the shackle from the closed position to the open position; and
a first frangible component, wherein the first frangible component is configured to break in response to application of a first threshold torque to the lock cylinder;
wherein the lock cylinder is configured to move in a direction transverse to a rotational axis of the lock cylinder to a displaced position in response to breaking of the first frangible component; and wherein, with the first frangible component broken and the lock cylinder in the displaced position, the lock cylinder is prevented from permitting movement of the shackle from the closed position to the open position.

7. The ring lock of claim 6, wherein the housing comprises the first frangible component.

8. The ring lock of claim 7, wherein the lock cylinder comprises a second frangible component configured to break in response to application of a second threshold torque to the lock cylinder; and wherein, with the second frangible component broken, the lock cylinder is prevented from permitting movement of the shackle from the closed position to the open position.

9. The ring lock of claim 6, further comprising a second frangible component; and wherein, with the lock cylinder in the displaced position, the second frangible component is configured to break in response to application of a second threshold torque to the lock cylinder.

10. The ring lock of claim 6, further comprising a latch, the latch having a blocking position in which the latch is operable to retain the shackle in the closed position, the latch having an unblocking position in which the latch is inoperable to retain the shackle in the closed position;

wherein, with the first frangible component unbroken, the lock cylinder is operable to move the latch from the blocking position to the unblocking position; and wherein, with the first frangible component broken, the lock cylinder is inoperable to move the latch from the blocking position to the unblocking position.

11. The ring lock of claim 10, wherein the lock cylinder comprises:
  a shell;
  a plug rotatably mounted in the shell; and
  a cam coupled with the plug, the cam including a shoulder;
  wherein the shoulder is operable to move past a ledge of the latch when the first frangible component is unbroken; and
  wherein the shoulder is configured to engage the ledge when the first frangible component is broken.

12. The ring lock of claim 11, wherein the cam is coupled with the plug via a second frangible component configured to break in response to application of a second threshold torque to the lock cylinder when the shoulder is engaged with the ledge.

13. A method of operating a portable lock apparatus comprising a lock cylinder, a shackle, and a first frangible component, the method comprising:
  receiving insertion of a key in the lock cylinder;
  in response to rotation of the key to an unlocking orientation, permitting movement of the shackle between an open position and a closed position;
  with the shackle in the closed position, receiving insertion of a tampering tool to the lock cylinder;
  in response to application of a first threshold torque to the lock cylinder via the tampering tool, breaking the first frangible component; and
  preventing movement of the shackle from the closed position as a result of breaking the first frangible component, the preventing comprising shifting the lock cylinder in a direction transverse to a rotational axis of the lock cylinder from a home position to a displaced position in response to breaking of the first frangible component.

14. The method of claim 13, wherein the portable lock apparatus further comprises a second frangible component; and
  wherein the method further comprises:
    after breaking the first frangible component, breaking the second frangible component in response to application of a second threshold torque to the lock cylinder via the tampering tool; and
    preventing movement of the shackle from the closed position as a result of breaking the second frangible component.

15. The method of claim 13, wherein the portable lock apparatus further comprises a housing;
  wherein the housing comprises the first frangible component;
  wherein the housing retains the lock cylinder in the home position when the first frangible component is unbroken; and
  wherein the lock cylinder moves from the home position to the displaced position in response to breaking of the first frangible component.

* * * * *